Dec. 18, 1951   C. M. CARSON   2,579,415
PACKAGING PROCESS
Filed Dec. 4, 1946
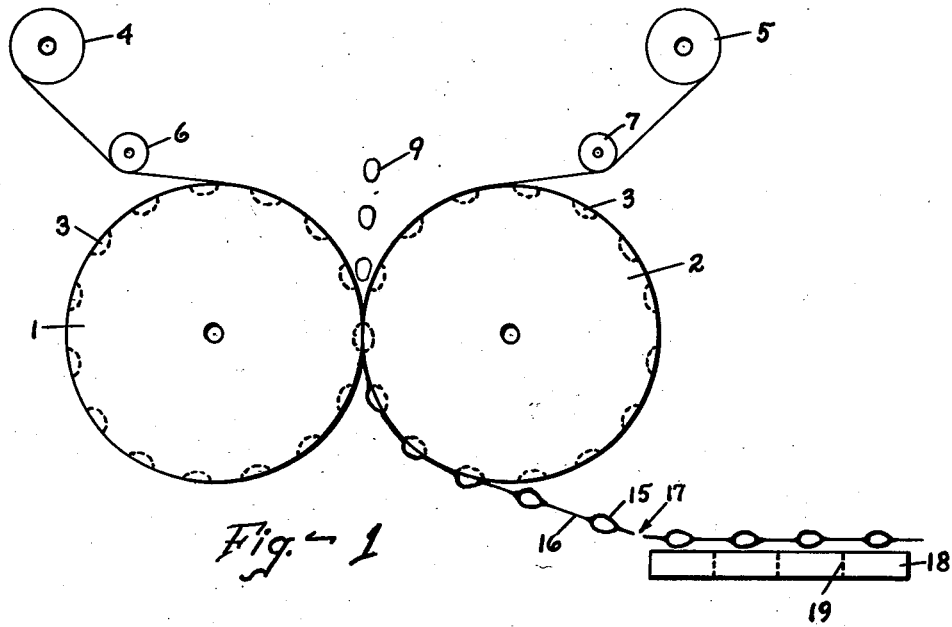
Fig. 1
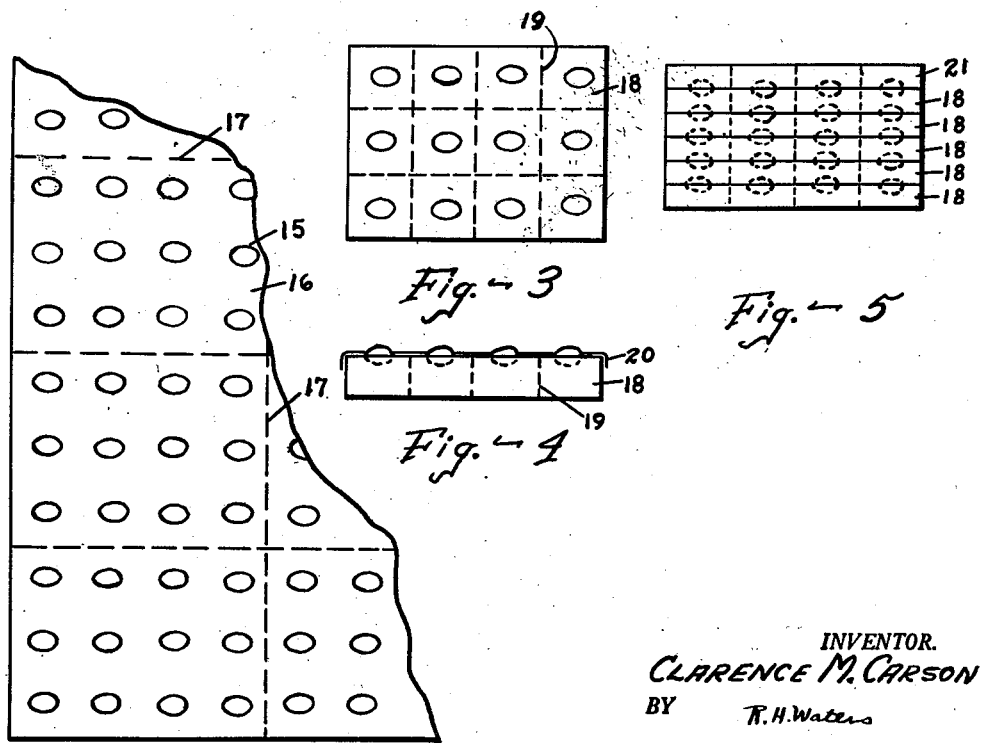
Fig. 2
Fig. 3
Fig. 4
Fig. 5
INVENTOR.
CLARENCE M. CARSON
BY R. H. Waters Patented Dec. 18, 1951

2,579,415

UNITED STATES PATENT OFFICE 2,579,415

PACKAGING PROCESS

Clarence M. Carson, Cuyahoga Falls, Ohio, assignor to Wingfoot Corporation, Akron, Ohio, a corporation of Delaware Application December 4, 1946, Serial No. 714,001

4 Claims. (Cl. 18—56)

This invention relates to packaging. More particularly, it relates to enclosing individual articles or groups of articles in separate pockets formed between two sheets of wrapping material and then supporting the individual pockets in a suitable shipping or display case. The process is designed particularly for packing and shipping soft articles, such as fruits and vegetables—for example, tomatoes, peaches, bunches of grapes, etc.—and frangible articles, such as Christmas tree ornaments, etc. By using transparent film as the wrapping material, an admirable display case is produced.

According to a preferred procedure, the articles are packaged by passing two sheets of the wrapping material between cupped rollers which are rotated to bring the cups in the respective rollers into mating position to form suitable receptacles for the articles being packaged and to enclose them in the wrapping material.

The wrapping material is of the heat-stretchable variety; that is, it is a plastic film which is easily stretched when heated. Such films may be made of rubber hydrochloride, polyethylene, etc. The wrapping material is heat-sealable. The plastic of which the film is formed may be inherently heat-sealable, or it may be coated with a heat-sealable covering. The film, after heating, may be stretched down into the cups by vacuum or a suitable plunger arrangement or by other suitable means. Alternatively, the film may be stretched by pressing against it the article which is to be packaged.

The invention will be further described in connection with the accompanying drawings, in which:

Fig. 1 illustrates schematically the packaging process;

Fig. 2 is a plan view of a sheet of the packaged articles;

Figs. 3 and 4 are a plan view and elevation, respectively, of a frame on which the sheet of articles is supported; and Fig. 5 is an elevation of a package formed from a plurality of such frames.

In the drawing Fig. 1 shows the cupped drums 1 and 2. The cups 3 are preferably all of the same size in both drums. The films from the supply rolls 4 and 5 are drawn down over the heated rollers 6 and 7, and then over the surfaces of the respective drums.

In a preferred arrangement the cups 3 are connected with hoses which are connected to the axes of the respective drums; and the axes, in turn, are connected with a vacuum pump. By suitable valve means a vacuum is drawn on the cups after they are covered with the heated film in order to stretch the film down into the cups. The vacuum is cut off of the cups in drum 1 just before these cups mate with the cups in drum 2. The vacuum is advantageously cut off of the cups of drum 2 at the same time but may be held until the cups reach the bottom of the drum. Instead of using a vacuum to stretch the heated film down into the cups, a plunger might be used, or the articles 9 may themselves be used to stretch the film by placing the articles against the heated films covering the cups just before the cups are brought together. This stretches the films snugly around the articles. The films may be stretched in any suitable manner.

The preferred film for this packaging operation is rubber hydrochloride film. It is not only thermostretchable but is also heat-sealable. It has the unique property of retaining its properties of heat-sealability and heat-stretchability for a considerable period after heating even though during that period the film is cooled to room temperature. Thus, the film may be heated at the rolls 6 and 7, and it may subsequently be cooled in passing to the drums; but even though it is cooled, it retains its heat-stretchability and heat-sealability at the drums. The two drums are mounted so that the films passing between them are pressed together. If the films have been heated to the temperature at which they form a permanent bond when pressure is applied, the areas surrounding the packaged articles will be permanently united. If, on the other hand, they are heated to a lower temperature, the bond between the two layers of film may be such that the films may later be separated without tearing them. Ordinarily, the films will be permanently united in the areas surrounding the articles. This is done by heating the films to a temperature around 220° F. as the films pass under the rollers 6 and 7.

On leaving the drums, the articles are enclosed in individual pockets 15 surrounded by the area of laminated film 16. The drums are ordinarily wide enough to accommodated several cups abreast; for example, there may be three or four abreast, but ordinarily will be many more, such as fifteen or twenty or more, depending upon the size of the article to be packaged.

Fig. 2 is a plan view of a section of such a sheet showing the packaged articles 15 and the surrounding film 16. The dotted lines 17 mark off areas which each contain a dozen of the articles. The sheets may be cut along the dotted lines 17 by a hot wire or suitable mechanical shearing means. Thus, in Fig. 1 the sheet will be cut longitudinally and also transversely at the position indicated by the arrow 17. The small sheets thus separated will be mounted in frames like the frame 18 which is divided into twelve separate compartments by the partitions 19. Fig. 4 shows an elevation of the completed package with the edges 20 of the sheet folded over the edge of the frame 18 and suitably fastened to it by adhesive or the like.

In this package the articles are individually supported by resilient means and are held out of contact with the supporting frame. Tomatoes, peaches, bunches of grapes, and frangible articles and the like may be shipped long distances in this manner without damage. Several such frames may be mounted on one another as shown in Fig. 5 so that the tops of the articles in one frame will be protected by the superimposed frame, and a covering frame 21 which contains no articles may be placed at the top of the stack for further protection. These stacked frames may be held together by adhesive tape or mechanical means or in any desired manner.

The frames may be of wood, chipboard, plastic or the like. The films may be of any suitable wrapping material and may be fastened to the frames in any desired manner. If the wrapping material is not rubber hydrochloride, it may be desirable to heat the films after pocketing the articles between them to cause the films to shrink and fit snugly around the articles. If the frames are stacked on one another, the films may be pinched between adjacent frame without being fastened to the particular frames which support them.

Instead of having the cups 3 in both rollers of the same depth, the cups in the roller 1 may be deeper than the cups in the roller 2, and in that case the union of the films will not be around the middle of the articles but will be toward the top of the articles. When suspended in the frames 18, the articles will then be largely located below the plane of the films. The tops of the articles may be below the tops of the frames. The same effect may be produced by using films of different thickness of films plasticized differently or films composed essentially of different plastic materials or films which for any other reason tend to shrink differently around the articles after having first been stretched to the size of cups which are considerably larger than the articles themselves. The same result may be accomplished by using cups of different size; i. e., making the cups in the drum 1 deeper than those in the drum 2.

Thus, various modifications may be made in the disclosure without departing from the invention which is defined in the appended claims.

What I claim is:

1. The process of packaging articles which comprises heating two films of rubber hydrochloride, forming cups in each of the films according to the same pattern, and bringing the cups into mating relation around articles, thus enclosing the articles in pockets formed from the cups, and uniting the areas of the films around the pockets to form an unsupported sheet in which the articles are enclosed in the aforesaid pattern; dividing said unsupported sheet into areas of the same shape and size and containing articles arranged in said pattern, and then mounting these sheets on frames no larger than said sheets, provided with openings therethrough arranged according to the identical pattern and adapted to hold said articles between them out of contact with one another.

2. The process of packaging articles which comprises heating two transparent films of thermostretchable heat-sealable material, forming cups in each of the films according to the same pattern, and bringing the cups into mating relation around articles, thus enclosing the articles in pockets formed from the cups, and uniting the areas of the films around the pockets to form an unsupported sheet in which the articles are enclosed in the aforesaid pattern; dividing said unsupported sheet into areas of the same shape and size and containing articles arranged in said pattern, and then mounting these sheets on frames no larger than said sheets, provided with openings therethrough arranged according to the identical pattern and adapted to hold said articles between them out of contact with one another.

3. The process of packaging articles which comprises heating two films or rubber hydrochloride, forming cups in each of the films according to the same pattern, and bringing the cups into mating relation around articles, thus enclosing the articles in pockets formed from the cups, and uniting the areas of the films around the pockets to form an unsupported sheet in which the articles are enclosed in the aforesaid pattern; dividing said unsupported sheet into areas of the same shape and size and containing articles arranged in said pattern, then mounting these sheets on frames no larger than said sheets, provided with openings therethrough arranged according to the same pattern and adapted to hold said articles between them out of contact with one another, and then stacking the frames on top of one another with the edges coinciding.

4. The process of packaging articles which comprises heating two transparent films of thermostretchable heat-sealable material, forming cups in each of the films according to the same pattern, and bringing the cups into mating relation around articles, thus enclosing the articles in pockets formed from the cups, and uniting the areas of the films around the pockets to form an unsupported sheet in which the articles are enclosed in the aforesaid pattern; dividing said unsupported sheet into areas of the same shape and size and containing articles arranged in said pattern, then mounting these sheets on frames no larger than said sheets, provided with openings therethrough arranged according to the same pattern and adapted to hold said articles between them out of contact with one another, and then stacking the frames on top of one another with the edges coinciding.

CLARENCE M. CARSON.

REFERENCES CITED

The following references are of record in the file of this patent:

UNITED STATES PATENTS

| Number | Name | Date |
| --- | --- | --- |
| 1,220,670 | Milliron | Mar. 27, 1917 |
| 1,946,285 | Judge | Feb. 6, 1934 |
| 2,008,659 | Salfisberg | July 16, 1935 |
| 2,141,318 | Salfisberg | Dec. 27, 1938 |
| 2,155,445 | Pittenger et al. | Apr. 25, 1939 |
| 2,438,069 | Carson | Mar. 16, 1948 |
| 2,484,780 | Clunan et al. | Oct. 11, 1949 |